United States Patent
Yoo et al.

(10) Patent No.: US 8,368,256 B2
(45) Date of Patent: Feb. 5, 2013

(54) VOICE COIL MOTOR

(75) Inventors: Hyuneo Yoo, Seoul (KR); Sanghee Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 131 days.

(21) Appl. No.: 13/031,888

(22) Filed: Feb. 22, 2011

(65) Prior Publication Data
US 2011/0204731 A1 Aug. 25, 2011

(30) Foreign Application Priority Data
Feb. 22, 2010 (KR) .................. 10-2010-0015830

(51) Int. Cl.
*H02K 41/035* (2006.01)

(52) U.S. Cl. .................. 310/12.16; 310/15; 310/20

(58) Field of Classification Search ............ 310/12.16, 310/15, 20, 21, 26, 27; 381/400–410
See application file for complete search history.

(56) References Cited

U.S. PATENT DOCUMENTS

| | | | |
|---|---|---|---|
| 4,832,891 A * | 5/1989 | Kass .................. | 264/101 |
| 6,437,463 B1 * | 8/2002 | Hazelton et al. .......... | 310/12.06 |
| 7,006,651 B2 * | 2/2006 | Ueki .................. | 381/396 |
| 7,410,811 B2 * | 8/2008 | Lin et al. .............. | 436/526 |
| 7,508,098 B2 * | 3/2009 | Lee et al. .............. | 310/12.06 |
| 7,925,028 B2 * | 4/2011 | Yokoyama et al. ........ | 381/71.2 |
| 2006/0202566 A1 * | 9/2006 | Osaka .................. | 310/12 |
| 2008/0231974 A1 * | 9/2008 | Jung .................. | 359/824 |
| 2009/0200885 A1 * | 8/2009 | Kikuchi et al. .......... | 310/156.78 |

* cited by examiner

*Primary Examiner* — Tran Nguyen
*Assistant Examiner* — Naishadh Desai
(74) *Attorney, Agent, or Firm* — Saliwanchik, Lloyd & Eisenschenk

(57) ABSTRACT

A voice coil motor (VCM) is disclosed. The VCM includes a base formed with an opening; a movable body including a bobbin arranged on the base and formed with a hollow hole and a coil arranged along a periphery of the bobbin; a stator including a frame-shaped magnet arranged on the base, the magnet being discrete from the coil and wrapping a periphery of the coil; and a case covering an upper surface and an outer surface of the magnet, the case being coupled to the base.

10 Claims, 3 Drawing Sheets

VOICE COIL MOTOR

CROSS-REFERENCE TO RELATED APPLICATIONS

This application claims the benefit under 35 U.S.C. §119 of Korean Patent Application No. 10-2010-0015830, filed Feb. 22, 2010, which is hereby incorporated herein by reference in its entirety.

BACKGROUND OF THE DISCLOSURE

1. Field of the Invention

The present disclosure relates to a voice coil motor.

2. Description of Related Art

Recently, various optical devices including mobile phones embedded with a super small digital camera and high resolution digital cameras have been developed. The super small digital camera embedded in the conventional mobile phone currently cannot adjust a gap between an image sensor and a lens. However, such a gap between an image sensor and a lens may be adjusted by a lens driving device such as a voice coil motor.

Related art voice coil motors (VCMs) generally include a base and a movable body coupled to the base. The movable body includes a bobbin accommodating the lens of the camera and a coil wrapping the bobbin. The VCM further includes a stator including a long magnet and a housing wrapping a yoke fixing the magnet. The magnet is arranged at a periphery of the movable body to face the movable body by the yoke fixing the magnet. Pan springs are arranged on an upper surface and a bottom surface of the movable body to resiliently support the stator and a spacer is arranged between each pan spring and the stator. A case surrounds the components of the VCM.

The VCM thus configured allows a gap between an image sensor and a lens to be adjusted by using electromagnetic force lines generated by the coil, and attractive force and repulsive force from electromagnetic force lines of the magnet facing the coil.

However, there is a disadvantage in using a long magnet because the long magnet fixed at the yoke is a high-priced sintered magnet and should be cut into several pieces that are, in turn, attached to the yoke, thereby consuming many hours for assembling the magnets and yoke and increasing the manufacturing cost.

Another disadvantage is that the manufacturing cost can be expensive because many elements of the VCM such as the yoke, housing, and spacer are employed for blocking the electromagnetic field generated by the coil and the magnet and for fixing the magnet. This component arrangement is similar to a spindle motor. However, the assembling processes of a spindle motor for the voice coil motor are complicated, increasing the assembling time and decreasing the productivity of the product.

Still another disadvantage is that it can be difficult to accurately control assembly allowances for the elements of the VCM when the VCM includes elements such as the yoke, housing, and spacer that are employed for blocking the electromagnetic field generated by the coil and the magnet and for fixing the magnet.

BRIEF SUMMARY

The present disclosure is directed to providing a voice coil motor (VCM) configured to reduce the number of constituent elements employed for a stator, simplify assembly processes, and/or reduce a manufacturing cost of a product by using a frame-shaped magnet.

In one general aspect of the present disclosure, there is provided a VCM comprising: a base formed with an opening; a movable body including a bobbin arranged on the base and formed with a hollow hole and a coil arranged along a periphery of the bobbin; a stator including a frame-shaped magnet arranged on the base, discrete from the coil and wrapping a periphery of the coil; and a case covering an upper surface and a rear surface of the magnet for being coupled to the base.

In certain embodiments, the frame-shaped magnet can have a square frame shape or a round pipe shape.

In an exemplary embodiment of the present disclosure, the magnet takes the shape of a square frame.

In some embodiments where the magnet takes the shape of a square frame, a corner formed by edges neighboring an inner lateral surface of the magnet may be formed with a protruder protruding to a curved surface from the corner.

In an exemplary embodiment of the present disclosure, the magnet takes the shape of a round pipe.

In some embodiments where the magnet takes the shape of a round pipe, an inner lateral surface of the magnet and a periphery of the coil are formed with an equidistant gap.

In some exemplary embodiments of the present disclosure, a bottom surface of the magnet contacting the base may be formed with an insulation member.

In some exemplary embodiments of the present disclosure, the VCM further comprises: a bottom pan spring fixed by a first distal end at a bottom end of the bobbin and by a second distal end facing the first distal end between the insulation member and the base; and an upper pan spring fixed by a third distal end at the upper surface of the bobbin, and a fourth distal end facing the third distal end inserted into an inner lateral surface of the magnet facing the bobbin.

In some exemplary embodiments of the present disclosure, a chamfer unit may be formed at the inner lateral surface of the magnet for inhibiting interference with the bottom pan spring.

In some exemplary embodiments of the present disclosure, the base may be formed at a periphery thereof with a hitching protruder, and the case may be formed with a coupling hole that is coupled to the hitching protruder.

In some exemplary embodiments of the present disclosure, the magnet may include a plurality of magnet particles, and an adhesive for bonding the plurality of magnet particles.

Technical problems to be solved by the present disclosure are not restricted to the above-mentioned description, and any other technical problems not mentioned so far will be clearly appreciated from the following description by those skilled in the art.

There is an advantageous effect in the voice coil motor according to certain embodiments of the present disclosure in that a magnet can be injection-molded by mixing a plurality of magnet particles with an adhesive, thereby enabling to realize a mass production of magnets, whereby a manufacturing cost of magnets can be reduced to uniformly and stably control the magnet quality.

There is another advantageous effect in the voice coil motor according to certain embodiments of the present disclosure in that a magnet can be injection-molded in the shape of a frame to function as a stator, thereby dispensing with a spacer by instead attaching an insulation member at the bottom surface of the magnet, whereby the number of assembling elements is greatly reduced to reduce the manufacturing cost, an assembly process can be simplified and an assembling time can be reduced to improve the productivity of products.

There is still another advantageous effect in the voice coil motor according to certain embodiments of the present disclosure in that reliability of products can be improved by easiness in controlling assembly allowances among constituent elements if the number of constituent elements to be assembled is reduced.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
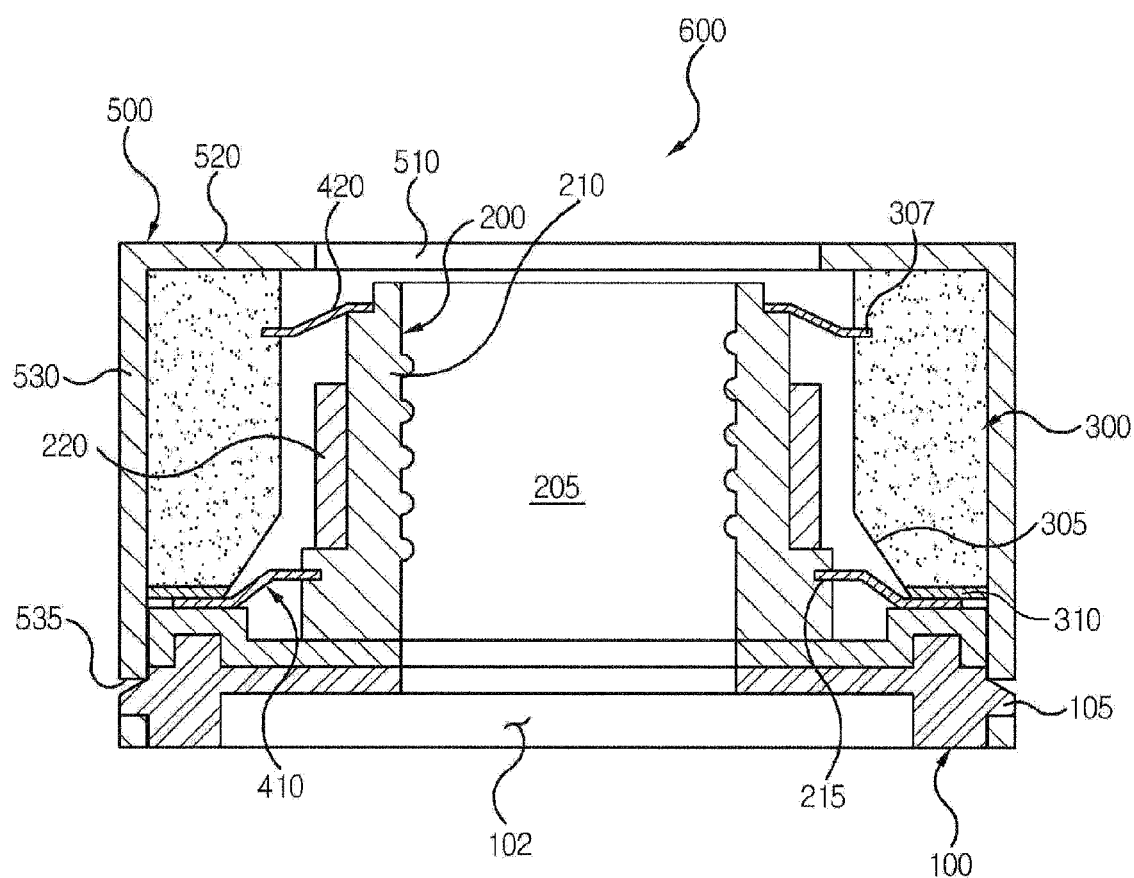
FIG. 1 is a cross-sectional view of a voice coil motor according to an exemplary embodiment of the present disclosure.

Advantages and features of the present invention may be understood more readily by reference to the following detailed description of exemplary embodiments and the accompanying drawings. Detailed descriptions of well-known functions, configurations, or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Now, a voice coil motor according to the present disclosure will be described in detail with reference to the accompanying drawings.

FIG. 1 is a cross-sectional view of a voice coil motor according to an exemplary embodiment of the present disclosure.

Referring to FIG. 1, a voice coil motor (VCM) 600 may include a base 100, a movable body 200, a stator 300, a bottom pan spring 410, an upper pan spring 420, and a case 500.

The base may take the shape of a square frame with an opening 102, for example. A periphery of the base 100 connecting an upper surface and a bottom surface of the base is protruded with a plurality of protruders 105 that are coupled to the case 500, each at a predetermined gap. In the present exemplary embodiment, the opening 102 of the base 100 may take a round shape when viewed from a top.

The movable body 200 may be arranged on an upper surface of the base 100. The movable body 200 may vertically move relative to the base 100 to horizontally move a lens (not shown) relative to the base 100. The movable body 200 may include a bobbin 210 and a coil 220.

The bobbin 210 functions to fix the lens, and is arranged on the upper surface of the base 100. The bobbin 210 is formed with a round hollow hole 205 that passes from an upper surface of the bobbin 210 to a bottom surface of the bobbin 210, where the hollow hole 205 is over the opening 102 of the base 100. An inner lateral wall of the bobbin 210 formed by the hollow hole 205 can be formed with a spiral groove for fixing a lens case (not shown) for accommodating the lens such that the lens is fixed to the hollow hole 205 of the bobbin 210 by the spiral groove.

A bottom periphery of the bobbin 210 is formed with an insertion groove 215 for fixing a bottom pan spring 410. The bobbin 210 may be formed thereon with a hitching sill on which an upper pan spring 420 is to be arranged.

The coil 220 is wound on a periphery of the bobbin 210. Both distal ends of the coil 220 are electrically connected to a corresponding one of the bottom pan springs 410, and a driving signal such as a current is provided to the coil 220 through the bottom pan springs 410.

Figure 2:
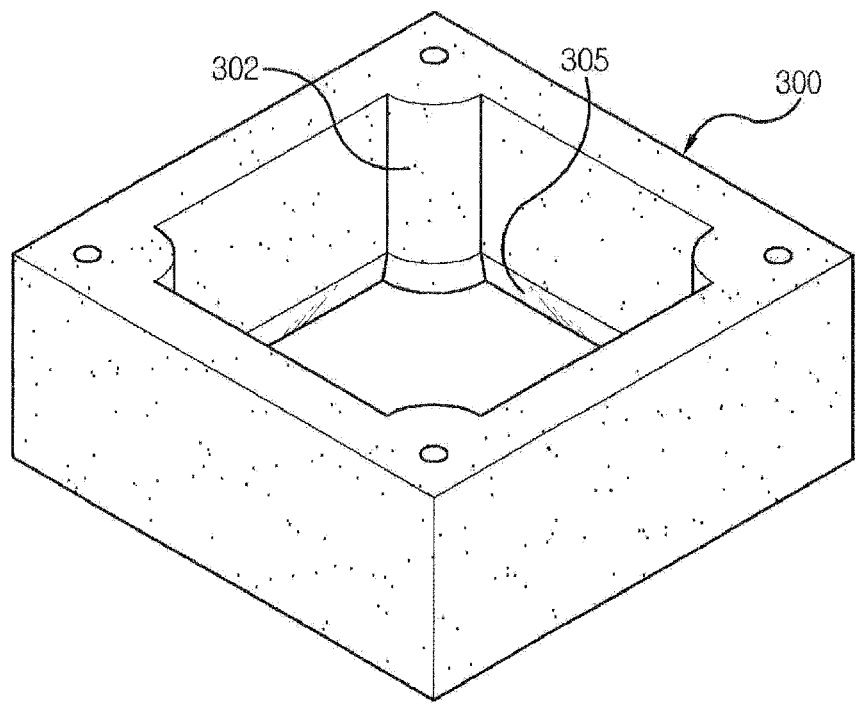
FIG. 2 is a perspective view of a stator of FIG. 1.

FIG. 2 is a perspective view of one embodiment of a stator of FIG. 1.

Referring to FIGS. 1 and 2, the stator 300 includes a frame-shaped magnet. The stator 300 (hereinafter referred to as the magnet) wraps the coil 220 (e.g., surrounds the outer periphery of the coil). The magnet 300 is arranged on the upper surface of the base 100 such that the magnet and the coil 220 are discretely disposed from each other.

The magnet according to the present exemplary embodiment may take the shape of a square frame. The magnet 300 may be formed at an inner lateral surface thereof with a protruder 302, a chamfer unit 305 and an insertion groove 307. The protruder 302 is protruded to a curved surface from four corners where two neighboring lateral surfaces meet among the inner lateral surfaces of the magnet 300. The chamfer unit 305 is formed to inhibit interference between a bottom pan spring 410 and the magnet 300, and is formed by a diagonal cut of the inner lateral surface from the bottom contacting the base 100 to a portion corresponding to a bottom distal end of the coil 220. A bottom width of the magnet 300 is narrower than an upper width of the magnet 300 due to the chamfer unit 305.

The insertion groove 307 may be formed at an upper predetermined portion of the magnet out of the inner lateral surface of the magnet 300 for fixing the upper pan spring 420. The magnet 300 may arranged thereunder with an insulation member 310 for insulating the bottom pan spring 410 from the magnet 300. The insulation member 310 may be formed by attaching an insulation tape to a bottom surface of the magnet 300, or by coating an insulation material to the bottom surface of the magnet 300 and curing the coated material thereafter.

Figure 3:
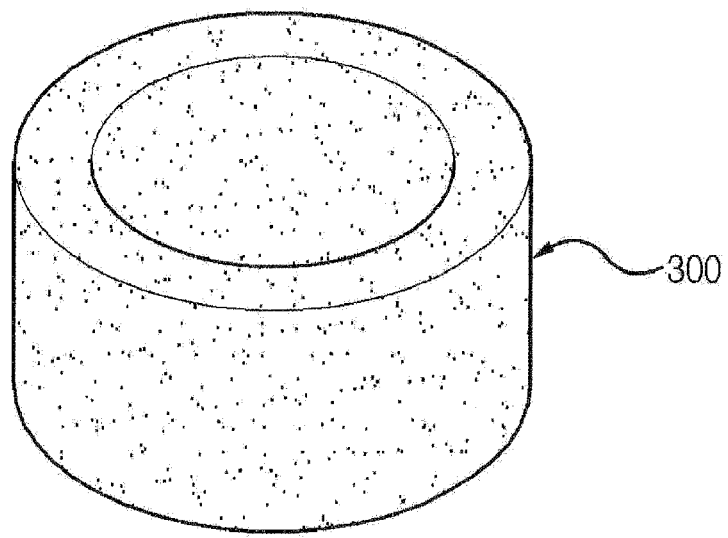
FIG. 3 is a perspective view of a stator according to another exemplary embodiment of the present disclosure.

FIG. 3 is a perspective view of a stator according to another exemplary embodiment of the present disclosure. A magnet 300 illustrated in FIG. 3 is substantially the same as that illustrated in FIGS. 1 and 2 except for the shape of the magnet 300, such that same reference numerals will be assigned to the same constituent elements in the explanations of the figures, and explanations that duplicate one another will be omitted.

Referring to FIG. 3, the magnet 300 may take the shape of a round cylinder, and an inner lateral surface of the magnet 300 is formed at the equidistant gap as that of a periphery of a coil 220.

The magnet that has been described with reference to FIGS. 2 and 3, can be injection-molded by inserting magnet particles and adhesives into a mold, such that the magnet is advantageous in that it is inexpensive, mass-producible, and uniformly controllable in quality.

Referring again to FIG. 1, a bottom pan spring 410 may be arranged at the bottom surface of the movable body 200 to elastically support the movable body 200. A first distal end of the bottom pan spring 410 is inserted into an insertion groove 215 formed at the bobbin 210 in order for the bottom pan spring 410 to be fixed at the bobbin 210, and a second distal end of the bottom pan spring 410 opposite to the first distal end is fixed between the bottom surface of the magnet 300 formed with an insulation member 310 and an upper surface of the base 100.

The upper pan spring 420 is arranged on the upper surface of the bobbin 210 to elastically support the bottom pan spring 410 and the movable body 200 at the same time. That is, a third distal end of the upper pan spring 420 is coupled to a hitching sill formed at an upper end of the bobbin 210, and a fourth distal end of the upper pan spring 420 opposite to the third distal end is inserted into an insertion groove 307 formed at an inner lateral surface of the magnet 300 and fixed thereat.

A case 500 covers the movable body 200, the bottom pan spring 410, the magnet 300 and the upper pan spring that are sequentially arranged on the base, so that the movable body 200, the bottom pan spring 410, the magnet 300 and the upper pan spring are not separated. The case 500 can be coupled to the base 100 by way of a hook coupling method. The case 500 may include a case upper plate 520 that covers the upper surface of the bobbin 210 and the upper surface of the magnet 300, and a case lateral plate 530 bent from the case upper plate 520 to cover a periphery of the magnet 300 and the base 100.

The case upper plate 520 is formed with a case opening 510 over the hollow hole 205 of the bobbin 210 to allow light to be incident on a lens coupled to the bobbin 210. The case lateral plate 530 is formed with a coupling hole 535 that is coupled to a hitching protruder 105 of the base 100. A bottom of the base 100 at the voice coil motor thus configured may be arranged with an image sensor module (not shown) that changes an outside light incident through the lens to a digital image.

Figure 4:
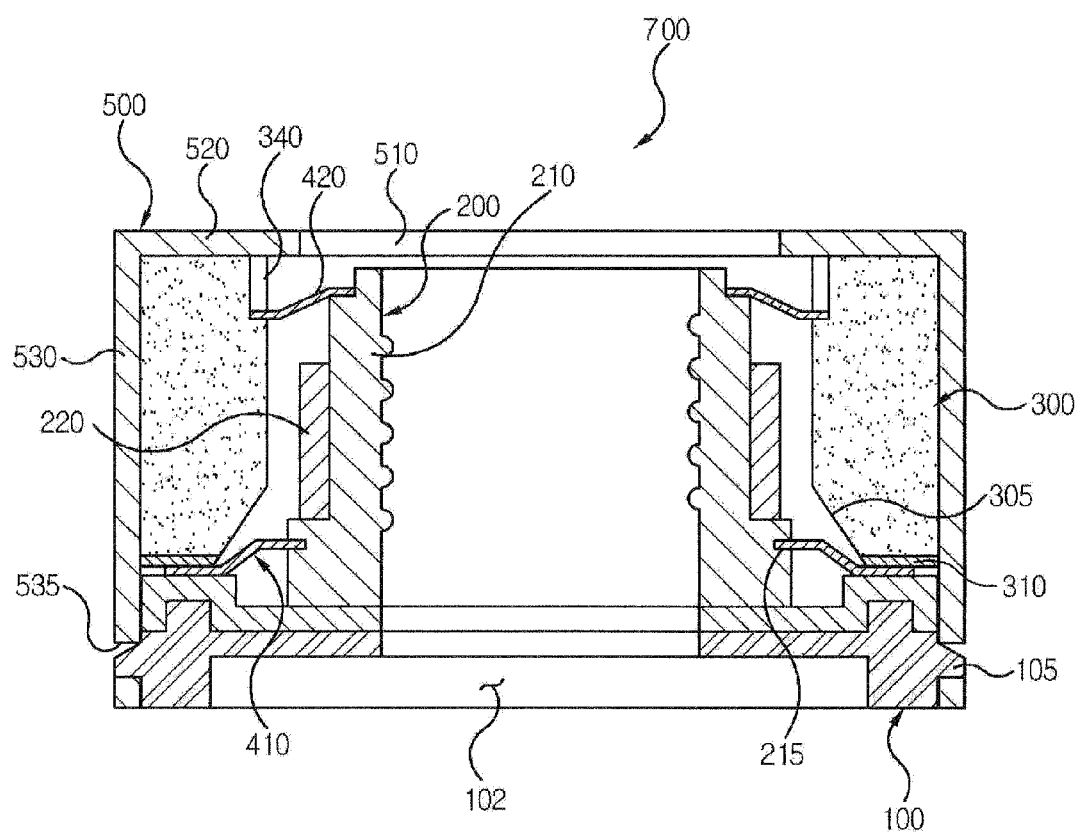
FIG. 4 is a cross-sectional view of a voice coil motor according to another exemplary embodiment of the present disclosure.

FIG. 4 is a cross-sectional view of a voice coil motor according to another exemplary embodiment of the present disclosure.

The voice coil motor 700 shown in FIG. 4 is substantially the same as that illustrated in FIG. 1 except for an inner surface of the magnet 300, such that same reference numerals will be assigned to the same constituent elements in the explanations of the figures, and explanations that duplicate one another will be omitted.

Referring to FIG. 4, an inner lateral surface of the magnet 300 is formed with a protruder 302, a chamfer unit 305 and a hitching sill 340. The protruder 302 and the chamfer of the magnet can be the same as the protruder and the chamfer described with respect to FIGS. 1 and 2, such that detailed explanation thereof will be omitted. Of course, the magnet 300 can have the square from shape of FIG. 2 or the round cylinder shape of FIG. 3.

The hitching sill 340 is a groove formed at a partial upper inner lateral surface of the magnet 300, is formed with a first distal end of the upper pan spring 420. The hitching sill 340 of the magnet 300 is positioned lower than a hitching sill formed at the bobbin 210.

As apparent from the foregoing, the voice coil motor according to the present disclosure can include a magnet that is injection-molded by mixing magnet particles and adhesives, and the injection-molded magnet is used as a stator to greatly reduce the number of constituent elements, whereby the number of assembling processes can be decreased to reduce the manufacturing cost.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A voice coil motor (VCM) comprising:
   a base formed with an opening;
   a movable body comprising:
      a bobbin arranged on the base and formed with a hollow hole, and
      a coil arranged along a periphery of the bobbin;
   a stator comprising a frame-shaped magnet arranged on the base, the frame-shaped magnet being discrete from the coil and wrapping a periphery of the coil; and
   a case covering an upper surface and an outer surface of the magnet, the case being coupled to the base,
   wherein a bottom of the magnet contacting the base is formed with an insulation member, and
   wherein the VCM further comprises:
      a bottom pan spring with a first distal end fixed at a bottom end of the bobbin and a second distal end opposite the first distal end fixed between the insulation member and the base; and
      an upper pan spring with a third distal end and fixed at an upper surface of the bobbin and a fourth distal end opposite the third distal end in a groove at an inner lateral surface of the magnet facing the bobbin.

2. The VCM of claim 1, wherein the magnet has a shape of a square frame.

3. The VCM of claim 2, wherein a corner of the magnet between neighboring edges of an inner lateral surface of the magnet is formed with a protruder protruding to a curved surface from the corner.

4. The VCM of claim 1, wherein the magnet has a shape of a round pipe.

5. The VCM of claim 4, wherein an inner lateral surface of the magnet and a periphery of the coil are formed with an equidistant gap.

6. The VCM of claim 1, wherein the groove is an insertion groove in which the fourth distal end is inserted.

7. The VCM of claim 1, wherein the groove is a hitching sill at a partial upper inner lateral surface of the magnet.

8. The VCM of claim 1, wherein a chamfer unit is formed at a lower portion of the magnet for inhibiting interference with the bottom pan spring.

9. The VCM of claim 1, wherein the base is formed at a periphery thereof with a hitching protruder, and the case is formed with a coupling hole that is coupled to the hitching protruder.

10. The VCM of claim 1, wherein the magnet includes a plurality of magnet particles, and an adhesive for bonding the plurality of magnet particles.

* * * * *